July 28, 1931.  J. H. CLARK  1,816,074
TRACTOR CUTTER
Filed Aug. 19, 1929  2 Sheets-Sheet 1
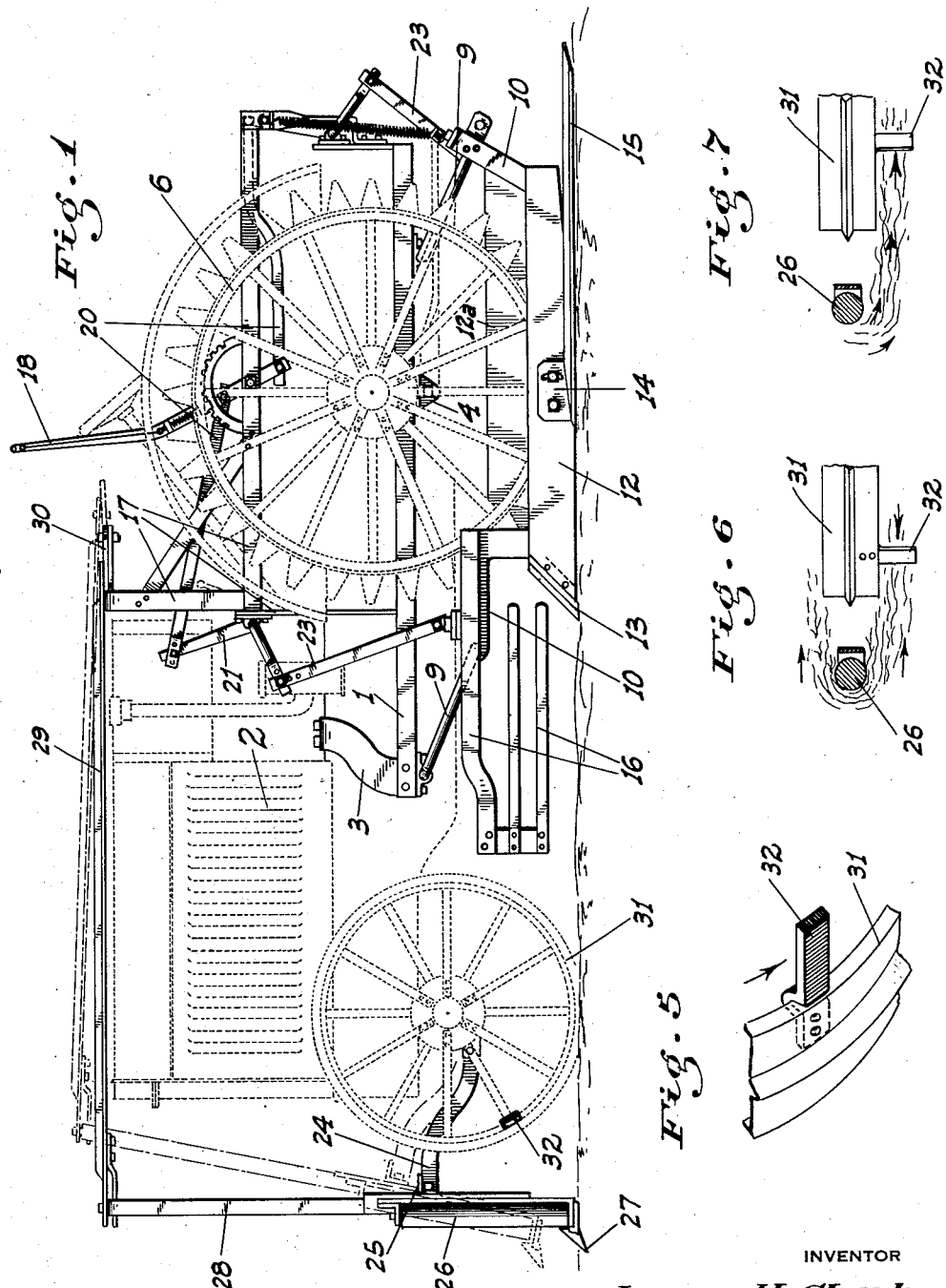
INVENTOR
James H. Clark
BY
ATTORNEY

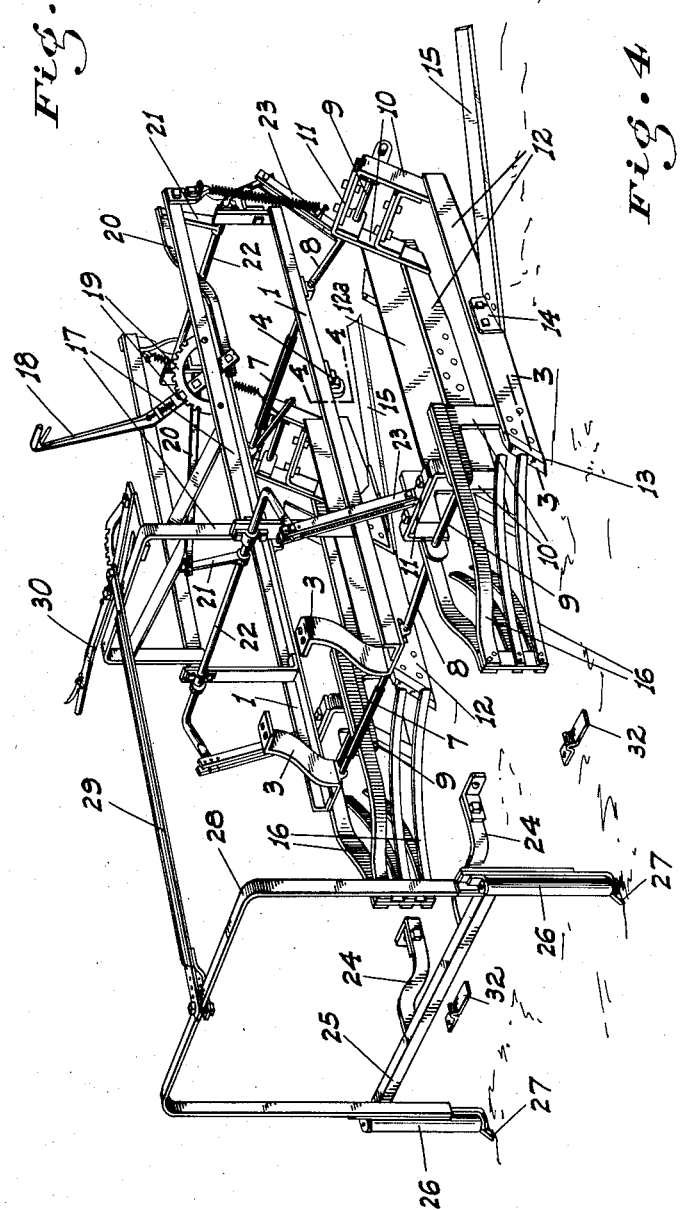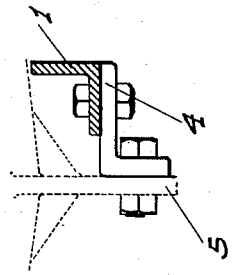

Patented July 28, 1931

1,816,074

UNITED STATES PATENT OFFICE

JAMES HOMER CLARK, OF MODESTO, CALIFORNIA

TRACTOR CUTTER

Application filed August 19, 1929. Serial No. 387,025.

This invention relates to cutters, such as bean cutters, my principal object being to provide a multi-row cutting machine of this character especially designed to be removably mounted on a tractor in such a manner that the knives of the cutter may be easily raised or lowered to proper cutting positions regardless of the hard or soft condition of the ground—a desideratum which it is impossible to properly obtain with the ordinary relatively light horse or tractor drawn implements.

Further objects are to provide a simple means for vertically adjusting the cutting units as a whole and to the same extent at both ends simultaneously; for altering the lateral spacing between the cutters according to the width of the wheels of the tractor, or as the spacing between rows of vines may require; for independently adjusting the vine separating elements vertically; and to provide means functioning automatically with the forward movement of the tractor for preventing the vines from possibly clogging or piling up against the separating members for any length of time.

These objects I accomplish by means of such structure and relative arrangement of parts as will fully appear by a perusal of the following specification and claims.

In the drawings similar characters of reference indicate corresponding parts in the several views:

Fig. 1 is a side outline of a tractor of a certain standard make showing my improved bean cutting apparatus mounted in connection therewith.

Fig. 2 is a perspective view of the cutter detached, the type shown being particularly for bean cutting.

Fig. 3 is a fragmentary sectional plan of a shoe and runner taken on the line 3—3 of Fig. 2.

Fig. 4 is a fragmentary cross section taken on the line 4—4 of Fig. 2.

Fig. 5 is a fragmentary perspective view of a front wheel of the tractor showing the vine depressing or clamping element mounted thereon.

Figs. 6 and 7 are diagrammatic plans showing the action of the vine separator and the wheel mounted vine depressing or clamping element.

Referring now more particularly to the character of reference on the drawings, the numeral 1 denotes a pair of transversely spaced beams which form the main supporting frame of the implement. These beams are rigidly secured at their front ends to the frame of the tractor 2 by brackets 3 and toward their rear ends by brackets 4 which are secured to the rear axle housing 5 of the tractor under the plane of the axle of the rear wheels 6. Turnably supported by the frame toward the opposite ends thereof are transverse shafts 7, on the ends of which outwardly of the frame are rearwardly depending arms 8. From the lower ends of these arms transverse spindles 9 project outwardly which support the vine cutting and deflecting units, of which there are two. Each of these units is constructed as follows:

The corresponding spindles 9 are each turnable and slidable in transversely spaced brackets 10 which are rigidly connected in laterally adjustable relation by transverse and overlapping connecting units 11. Secured to the lower end of the brackets are longitudinally extending runners 12 having sharp edged shoes or tips 13 secured to their forward ends, which ends are adjacent the foremost brackets 10. Intermediate their ends angle plates 14 are secured to and project outwardly from the runners, on which plates angled and outwardly extending flat cutting knives 15 are secured. Each plate 14 is secured to the runners by longitudinally spaced bolts as shown, one of which bolts works in a slot in the plate arcuate with the other bolt. This enables the angle of the cutter relative to a horizontal plane to be adjusted somewhat to suit different conditions. The lower edges of the runners slope upwardly to the rear of the plates, as shown in Fig. 1, so that said runners do not engage the ground rearwardly of the knives. The inner runner has an upstanding apron 12a mounted thereon which prevents the vines inwardly of the same from leaning over into the path of the adjacent tractor wheel which is disposed between the runners.

Forwardly extending and laterally flexible guard and vine deflecting bars 16 are secured to the forward brackets 10 and converge to a junction with each other in the transverse plane centrally between the runners some distance ahead of the same. These deflecting bars not only act to push the vines away from each other and into the path of the cutters but also prevent said vines from possibly remaining in the path of the wheels which, as stated, are disposed between the adjacent runners. The forward ends of the runners are disposed so as to be as close as possible to the front of the wheel. This arrangement prevents the runners from digging to any extent into ridges which may be on the ground, since the wheels engage and ride on such ridges and raise the runners almost as soon as the forward ends of the runners themselves reach the ridges.

An auxiliary frame structure 17 is supported by and projects upwardly from the main frame 1 so as to be clear of the tractor mechanism, and such structure forms the supporting means for the vertically adjustable and supporting mechanism of the runner and cutter units. Such mechanism comprises a vertical lever 18 pivoted intermediate its ends on said frame structure and provided with a pawl and ratchet quadrant 19 of ordinary character to enable it to be maintained in any position. Links 20 connected to the lever above and below its pivot extend forwardly and rearwardly respectively to connections with radial arms 21 which project upwardly from transverse shafts 22 journaled on the auxiliary frame structure. These shafts are operatively connected at one end, by suitable linkage 23, to the forward runner connecting unit 11 and to the rear arm 8 on the same side, so that when the lever is turned one way or the other the cutting mechanism is adjusted vertically to the same extent at both ends.

The runner and cutter unit on the opposite side is of course simultaneously adjusted and also to the same extent, owing to the connection of the shaft 7 and the arms 8 therewith, which are turned as the links 23 are raised or lowered. By reason of the cutter frame 1 and the auxiliary frame 17 being rigidly mounted directly on the tractor, any necessary downward pressure may be exerted on the runners so as to force them into the ground regardless of whether the ground be hard or not. This is because the main frame of the implement practically has the entire weight of the tractor thereon, which weight of course cannot be lifted with any downward pressure which the operator may exert against the runners.

The space between the runners may be altered as may be necessary on account of the width of the wheels, or the space between adjacent rows of vines, by adjusting the connecting members 11; the spindles each being slidable in the brackets 10, permitting this to be done to the small amount necessary without altering any parts. The space within the frame 1 may also be altered to a slight extent if necessary, the shafts 7 being preferably made of a telescopic character to enable this to be done.

Pivotally connected to and projecting upwardly from the rigid front axle or similar part of the tractor are arms 24, to the forward ends of which a cross bar 25 is rigidly secured. Mounted in rigid connection with this bar at its outer ends are vine separators which are in the form of vertical rollers 26 having downwardly angled and forwardly projecting fingers 27 at their lower ends. These separators lie in the plane of the forward ends of the deflector units 16. Rigidly mounted in connection with the cross-bar 25 and the rollers 26 is an upwardly projecting yoke 28 to the top of which a rearwardly extending link 29 is connected, this yoke extending sufficiently high so that the link clears the hood of the tractor engine as shown. The rear end of the link is connected to a horizontally disposed lever 30 which is pivoted on the auxiliary frame structure 17. This arrangement causes a movement of the lever in one direction or another to swing the separators about the pivotal connection of the bars 24 with the tractor as an axis, resulting in the raising or lowering of the separator rollers, as may be desired.

Projecting laterally from each front wheel 31 of the tractor is a plate 32 arranged so as to be to one side of the adjacent separator roller and in the path of one of the rows of vines. This plate with each revolution of the wheel engages the vines and holds the same clamped against the ground. As a result should the vines tend to tangle or clog up against the separator they are intermittently torn free of the same and disentangled. This is on account of the fact that while the vines are held against movement for a short time the separators are still advancing, and the resistance of the intertwined and tangled vines at the separators is less than where they are clamped against the ground.

I desire to emphasize the importance of mounting the side runners and blades directly to the side of or in a common transverse plane with the wheels, and so proportioned that the length of the runners is but little greater than the diameter of the wheels. This arrangement, as previously stated, is of great benefit in preventing checked ground being cut into to any extent.

While I have shown the tractor as having round wheels, it may be one of that type having endless tracks instead of such wheels.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In a vine cutter, an element to separate the vines of adjacent rows prior to the cutting of the vines, and means functioning with the forward movement of the cutter to intermittently clamp the separated vines rearwardly and on one side of the element against the ground.

2. In a vine cutter, an element to separate the vines of adjacent rows prior to the cutting of the vines, a ground engaging wheel disposed rearwardly of and substantially in line with the separating element, and a bar secured to and projecting laterally from the rim of the wheel so as to lie in the path of one of the rows of separated vines.

3. In combination with a tractor having driving wheels, a vine cutter mounted in direct connection therewith and including pairs of side runners between which the wheels are disposed, and cutters secured to and projecting from the opposite sides of the adjacent pairs of runners.

4. A structure as in claim 3, in which the runners terminate adjacent the plane of the front of the wheels.

5. In combination with a tractor having driving wheels, a vine cutter including pairs of side runners between which the wheels are disposed, cutters secured to and projecting from the opposite sides of the adjacent pairs of runners, a frame mounted on the tractor, and vertically adjustable means mounted on the frame and connected to the runners to support the same.

6. In combination with a tractor having driving wheels, a vine cutter including pairs of side runners between which the wheels are disposed, cutters secured to and projecting from the opposite sides of the adjacent pairs of runners, a frame mounted on the tractor, and means including a single lever mounted on the frame for supporting said runners and for vertically adjusting both pairs of runners simultaneously and to the same extent at both ends.

7. In combination with a tractor having driving wheels, a vine cutter including pairs of side runners between which the wheels are disposed, cutters secured to and projecting from the opposite sides of the adjacent pairs of runners, a frame mounted on the tractor, vertically adjustable supporting means for the runners at their opposite ends mounted on the frame, and means including a single lever mounted on the frame for moving all said supporting means simultaneously and to the same extent.

8. In combination with a tractor having driving wheels, a vine cutter mounted in direct connection therewith and including pairs of side runners between which the wheels are disposed, and deflecting and guard units secured to the forward ends of the runners and extending thence forwardly in converging relation to each other.

9. A vine cutter including a frame, wheels supporting the same, pairs of side runners between which the wheels are disposed, and deflecting and guard units projecting forwardly from the runners and to the sides of the wheels in converging relation to each other.

10. A vine cutter including a frame, wheels supporting the same, and horizontal cutting blades supported from the frame and disposed in rearwardly diverging relation to each other; the forward ends of the blades being disposed substantially in transverse alinement with the vertical plane of the wheel-axes.

In testimony whereof I affix my signature.

JAMES HOMER CLARK.